Aug. 12, 1969  G. SCHULIN  3,460,637
OSCILLATING WORKING DEVICE
Filed Aug. 21, 1967  4 Sheets-Sheet 3

United States Patent Office 3,460,637
Patented Aug. 12, 1969

3,460,637
OSCILLATING WORKING DEVICE
Gotthilf Schulin, Fellbach, Germany, assignor, by mesne assignments, to Wacker-Werke KG, Munich, Germany
Filed Aug. 21, 1967, Ser. No. 666,231
Claims priority, application Germany, Aug. 25, 1966, Sch 39,453
Int. Cl. E21b 3/08
U.S. Cl. 175—56                                22 Claims

ABSTRACT OF THE DISCLOSURE

Oscillatory system for a working element in which two oscillatory systems exert oscillatory forces on the working element at respectively different frequencies so the working element performs work oscillations with idle oscillations interposed therebetween.

---

The present invention relates to an apparatus with an oscillating working member for transmitting kinetic energy to an object to be machined. Oscillating working devices of the above mentioned type in which the energy transfer is effected by forced oscillations or by the creation of resonance oscillations of a spring-mass oscillating system are known in numerous designs. The working frequencies, especially with bigger machines, are within the lower sound frequency range or below said range, namely approximately between ten and hundred Hertz (oscillations per second). Furthermore, oscillating working devices with resonance oscillators are known the working frequency of which is within the ultrasound range.

In connection with the present invention, those conditions of operation of oscillating devices are considered in which between the oscillating working member and the object to be machined energy is transformed in kinetic form, namely by means of shock and/or pressure or pulling forces effective in the phase of movement, which means in a range of movement which is spaced from the reversing points of the oscillation. The term "machining an object" covers various types of machining, including a conveying and shaking operation. In the following description, the working conditions are considered on the basis of a shock-like energy transfer between the working member and the object to be machined. The results of this consideration are, of course, also in an analogous manner to be applied to working operations with other kinds of energy transfer, as for instance by friction contact between the transferring parts.

With the energy transfer by shock between the oscillating working member and the object to be machined, the realization of the intended high shock output and thus of the high degree of efficiency depends on the contact between the working member and the object not only at the highest possible speed of the working member but also over as large a section as possible of the oscillating stroke. This means that the working member and the object to be machined will in the intervals between successive oscillations or shock strokes have to be moved toward each other as close as possible after the respective preceding shock or pushing operation resulted in moving the working member and the object to be machined away from each other. Working member and object or article to be machined thus have between the individual oscillations or shock operations to be accelerated in mutual approaching direction. Since, however, on one hand the time interval available between successive shock operations for the mutual approach decreases with increased working frequency and since, on the other hand, the force available for the approaching acceleration is, of course, limited, also the absolute reapproach and thereby the distance of the contacting point between working member and article to be machined from the oscillating reversing point and consequently the efficiency of the shock operation will decrease with increasing frequency. This phenomenon will be further increased by non-linear conditions as a result of which below certain limit values of the shock impulse practically no effect at all occurs. The above mentioned phenonenon thus limits the increase of the working frequency of oscillating devices by relatively narrow limits even though such frequency increase by itself would be desirable to a great extent in view of the oscillating amplitude decreasing in opposite direction at constant oscillating energy and thereby at decreasing machine size. Also the exploitation of the natural frequency and the resonance conditions of the articles to be machined frequently make a relatively high working frequency appear expedient. It should also be noted that the above outlined difficulties which work against an increase in the working frequency beyond certain limits cannot be overcome by a correspondingly increased pressing force and approach acceleration between the working member and the article to be machined. Even if in this way a sufficiently great distance between contacting and reversing point were realized, i.e., a sufficiently large shock path or stroke, this would at best result in an undue load and thereby damping of the oscillating system which in its turn would bring about an unfavorable ratio of idle power and effective power within the oscillating system. Generally, a high ratio is desired of oscillating, i.e., idle power swinging between elastically stored energy and kinetic energy to the effective energy determined by the emitted shock output (and losses).

It is, therefore, an object of the present invention to provide an oscillating working device which will overcome the above mentioned drawbacks.

It is another object of this invention to provide an oscillating working device which will over heretofore known devices of the type involved make it possible to increase the working frequency with sufficient shock power or sufficient shock impulse and without unduly damping the oscillating system.

These and other objects and advantages of the invention will appear more clearly from the following specification in connection with the accompanying drawings, in which.

Figure 7:
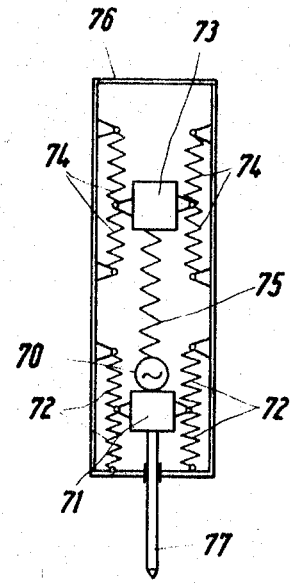

FIG. 7 diagrammatically illustrates the design of an oscillating working device with two oscillating systems and one exciter which is directly connected to one oscillating system and is connected to the other oscillating system through a coupling spring.

Figure 8:
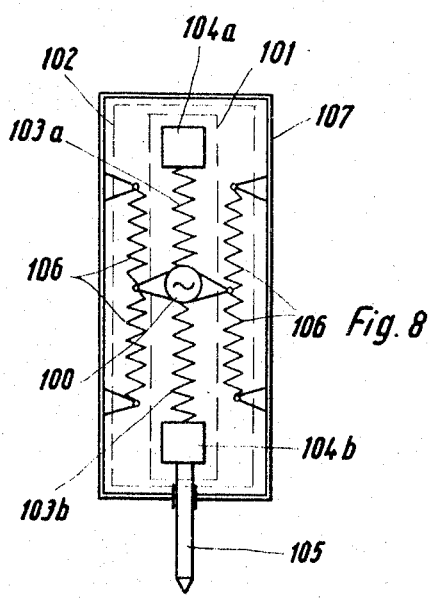

FIG. 8 shows still a further modified oscillating working device with an exciter for two oscillating systems, one oscillating system together with the exciter forming the mass of the second oscillating system.

Figure 9:
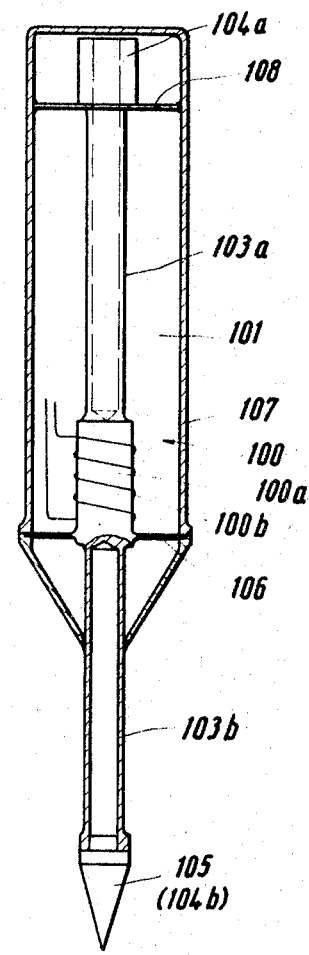

FIG. 9 shows the structural design of an oscillating working device according to the preceding figure.

The present invention is characterized primarily in that only a portion of the oscillations of the working member is provided for transferring energy to the article to be machined, and that the reversing points of the energy transmitted oscillations are locally offset relative to the reversing points of the energy maintaining oscillations. The advantageous operation of this arrangement is due primarily to the fact that on one hand in view of the offsetting of the reversing points, the approaching stroke to be performed between successive oscillations is reduced with the same total approach of the working member and the article to be machined, whereas on the other hand a portion of the reversing points no longer leads to a contact with the article whereby a renewed storage of oscillating energy is made possible in the intervals between successive shock operations.

A preferred embodiment of a device according to the present invention realizes a local offsetting of the reversing points and thus an intermittent shock operation by the fact that for purposes of offsetting the reversing points there is provided a device for superimposing at least two partial oscillations with different frequencies. In this connection, according to the invention, large as well as small frequency differences may be employed. In the first instance, for instance, a high frequency oscillation of the working member is effective upon the article to be machined only within a certain range of the unilateral maximum deviations of an additively superimposed low frequency oscillation, whereas within the range of the passage through zero and the opposite maximum deviation of the low frequency oscillation, no shock contact occurs between working member and article to be machined. At low frequency differences, however, there is obtained the resultant oscillation picture of a surge or beat or a multiple superposition while likewise an intermittent shock operation with contact between working member and article to be machined occurs only within the range of the maximum deviation pulsating at the differential frequency. In both instances, during periodically succeeding time intervals oscillation reversing points are obtained which advance in the direction toward the article to be machined whereby the approaching stroke between the working member and the article to be machined required for a certain shock stroke, and thus the approaching acceleration and the approaching force to be effected, will be reduced. The oscillating system is adapted during the intervals between successive shock periods to be charged again to a high oscillating energy.

Starting from the just explained principle, a further development of a device according to the present invention is characterized in that two oscillating systems are provided which comprise springs and masses and are provided with an exciter each and are interconnected by a coupling spring. The features of another embodiment of the invention based on the same principle is characterized in that two masses are provided which are interconnected by a coupling spring and of which one of said masses is associated with an oscillation exciter whereas the other one comprises the working member. Both masses are at least approximately of the same magnitude, and the coupling spring is suspended on a housing in an oscillation node.

It is also to be noted that similar effects can be realized by changing the exciter frequency or the exciter intensity of the oscillating system connected to the working member.

The embodiment of the present invention which operates with the superposition of oscillations of different frequencies, may be advantageously further improved by providing an exciter for at least two coupled oscillating systems while the natural frequency of at least one oscillating system differs from the exciter frequency. In this way a portion of the oscillating energy passes from the exciter through the coupling between the various oscillating systems also to the oscillating system with a natural frequency differing from the exciter frequency which oscillating systems are thus rocked to resonance oscillations. By superimposing the various oscillating forms in the working member also in this instance an intermittent shock operation will be realized.

A preferred embodiment of the last mentioned design is characterized in that the structural unit of the first oscillating system is through the springs of the second oscillating system connected to the housing acting as counter mass. The structural unit of the first oscillating system is advantageously through the spring of the second oscillating system connected to a housing of the entire device. Furthermore, in this connection it is advantageous to design the structural unit of the first oscillating system as a symmetric longitudinal oscillator, especially as semiwave oscillator with masses arranged at both ends of a longitudinal oscillating spring, and to connect this structural unit within the range of an oscillating node with the housing. This brings about the advantage that only that energy content is transferred to the housing which is necessary for rocking up the oscillations of the second oscillating system. This is advantageous particularly when according to another development of the structural unit of the first oscillating system is designed as high frequency oscillator and when the second oscillating system designed as mass, spring and housing is designed as low frequency oscillator. For certain fields of application, it is particularly advantageous so to adjust the frequency conditions that an oscillating system which by its natural frequency differs from the exciter frequency is selectively adapted, by introducing an impulse, especially by pushing the working member toward the article to be machined, to be subjected to an oscillating operation.

With all embodiments comprising a plurality of oscillating systems of which at least one differs as to its natural frequency from the exciter frequency, the oscillations of the exciter can be rocked up at increased speed by manual abutment of the working member against the article to be machined. The oscillating conditions can with such devices also in a simple manner be so adjusted that, for instance, a low frequency oscillating system will not be influenced by the high frequency exciter without shocks and thus will remain at rest. The device may then in a simple manner selectively be used as a pure high frequency oscillator or as shock device according to the operation in conformity with the present invention.

Generally it is understood that with the device according to the present invention instead of an excitement with high or low frequency sine-oscillation, an excitement with periodically succeeding impulses of a different form may be adopted. In particular, with embodiments comprising a high frequency and a low frequency oscillating system, it is advantageous to employ an impulse-like excitement with corresponding low following frequency for the last mentioned system.

Figure 1:
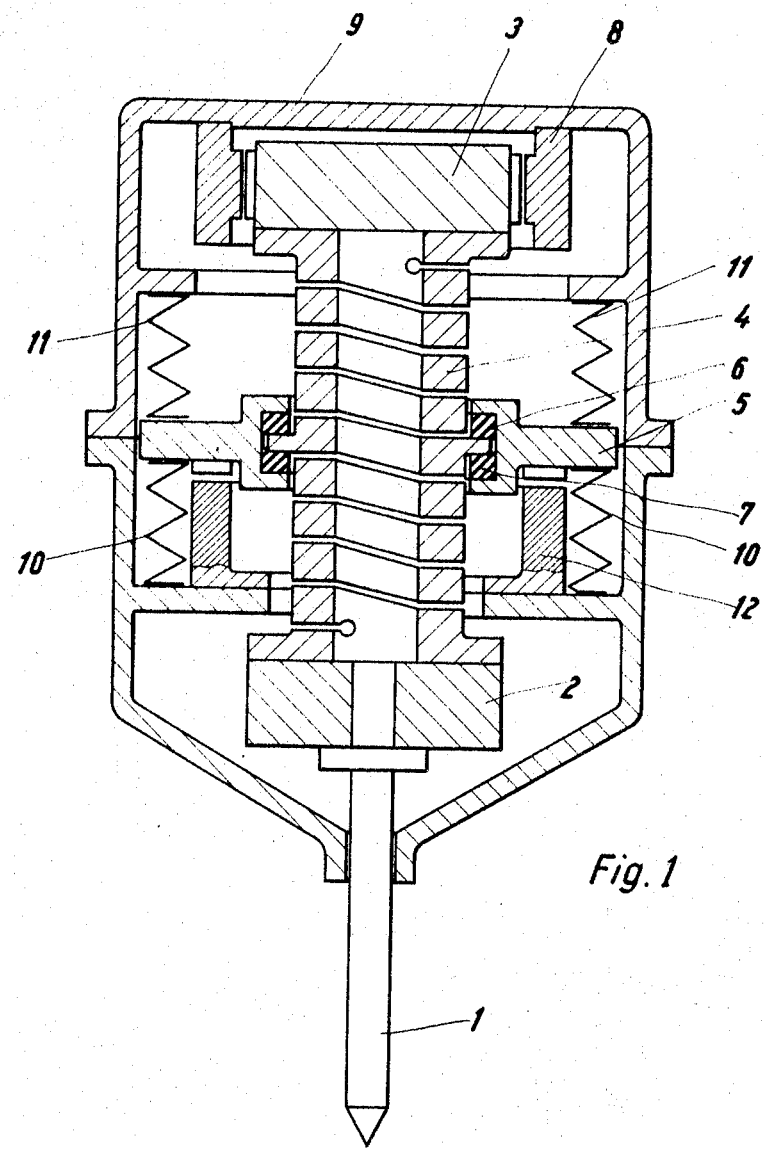
FIG. 1 illustrates a first embodiment of a manually operable oscillating hammer according to the present invention.

Referring now to the drawings in detail, FIG. 1 illustrates a chisel 1 which represents a working element and is connected to a first oscillating mass 2 which in its turn is connected to a second oscillating mass 3 through the intervention of a longitudinally oscillating spring 4. Spring 4 is engaged by an electromagnetic exciter 8 which is connected to the housing 9 of the device. The said exciter 8 is adapted to drive the oscillating system formed by the masses 2, 3 with the spring 4. The second oscillating system comprises a flange-shaped mass 5 which on one hand is coupled to the central section of spring 4 of the first oscillating system by means of rubber springs 6, 7, and on the other hand is suspended in the housing 9 by means of longitudinally oscillating springs 10, 11. A separate electromagnetic exciter 12 is provided for the second oscillating system. The chisel 1 is adapted to move relative to the housing 9 under the superimposed effect of the two oscillating systems.

Figure 2:
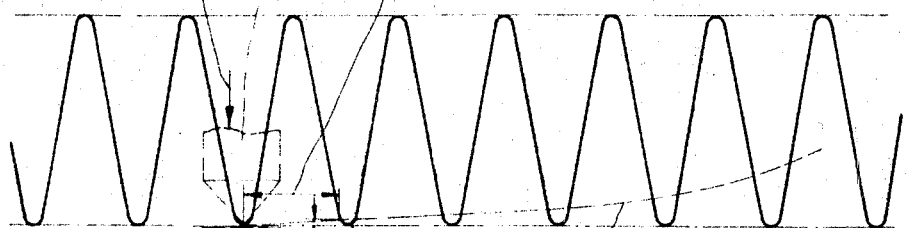
FIG. 2 is a time diagram of a uniform oscillation of a simple oscillating system with plotted shock stroke with introduced approaching force between working member and article to be worked.
Figure 4:
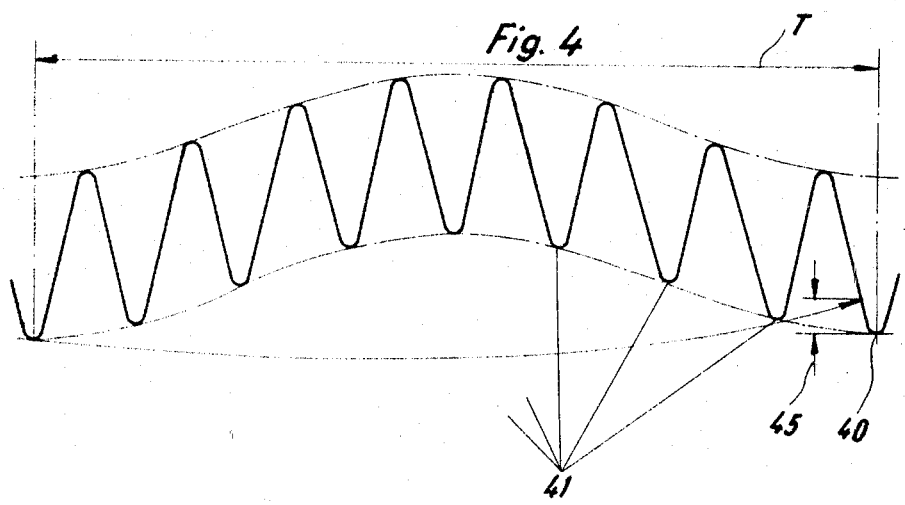
FIG. 4 shows the superposition of a high frequency and a low frequency oscillation likewise while taking into consideration the shock conditions.

If only one oscillating system is effective in the device according to FIG. 4, for instance if the springs 10, 11 were replaced by rigid connections, a uniform oscillation according to FIG. 2 would be obtained for the chisel 1 as working element. For the shock or pushing operation between the chisel 1 and an article 13 (see FIG. 2) to be machined, the following conditions will be encountered.

It may be assumed that at the end of each pushing operation there exists contact between chisel 1 and article 13 at a reversing point of the oscillation. Starting from such contacting or reversing point 21, it will be appreciated that up to the next stroke of the oscillating chisel, i.e. within the time interval 22, the chisel and the article to be processed will approach each other, for instance, by a distance 23 (FIG. 2) which distance corresponds to the pushing stroke for the subsequent pushing operation. This approach follows the curve 24 under the influence of a pressing force or acceleration between the chisel and the article as indicated by the arrows 25. The time interval 22 between the contacting point 21 and the first contacting point 26 of the next following pushing operation will decrease in opposite direction to the oscillating frequency so that also the approaching or pushing stroke 23 will decrease with increasing frequency. With the desired higher working frequencies, thus with the practically available pressing forces an extremely short pushing stroke, as indicated in FIG. 2, will be obtained.

Figure 3:
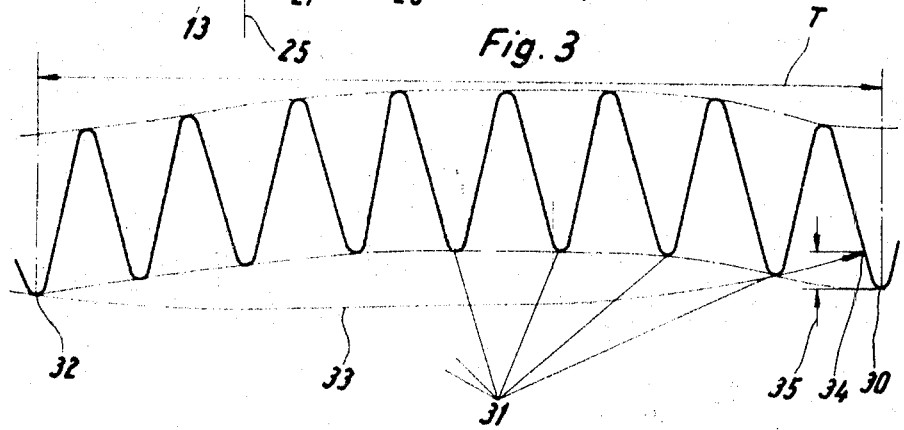
FIG. 3 shows an oscillation according to FIG. 2 with superimposed impulse while taking into consideration the shock path resulting therefrom.

FIG. 3 illustrates the superimposing of a high frequency oscillation according to FIG. 2 with a flat impulse of the duration T which amounts to a multiple of the duration of the high frequency oscillation. As a result thereof, the energy transmitting reversing or contacting points 30 are locally offset with regard to the push-free reversing points 31 of the high frequency oscillation and, more specifically, in the meaning of a movement away of the reversing point 31 or in the meaning of a movement of the reversing points 30 toward the article (said article and the working member not being shown in FIG. 3).

Starting from the last contact point 32 between the working element and the article, the approach is effected during the impulse duration T according to a trajectory parabola 33 which leads to the first contact point 34 of the next following pushing operation which ends when the reversing point 30 is reached. The setting back of the last one of the reversing points 31 ahead of the contacting point 34 will clearly indicate that in view of the superposition according to the invention, even with a less inclination of the trajectory parabola with regard to FIG. 2, a considerably larger approaching or pushing stroke 35 will be obtained. At the same time, it is possible to provide a considerably higher energy transfer for the pushing operation because the oscillating systems are able during the interval between succeeding pushing operations to store again sufficient oscillating energy.

Analogous considerations apply for the superposition of a high frequency oscillation with a low frequency oscillation of the period duration T according to FIG. 4. Also in this instance, the contact-free reversing points 41 of the high frequency oscillation are replaced relative to the reversing point 40 as end point of a pushing operation in the meaning of a spacing between the working element and the article whereby again a considerably increased pushing stroke 45 is obtained.

Figure 5:
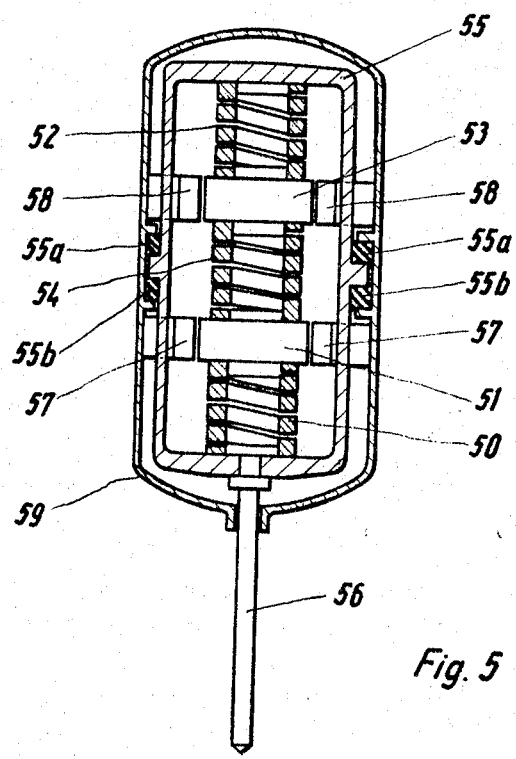
FIG. 5 shows a modified oscillating hammer according to the invention with two oscillating systems interconnected by a coupling spring.

The oscillating working device according to FIG. 5 comprises two working systems which are connected to each other by means of a coupling spring (coupled oscillator). The first oscillating system comprises a spring 50 and a mass 51, and the second oscillating system comprises a spring 52 and a mass 53. These springs as well as the coupling spring 54 interconnecting the said two oscillating systems are formed by longitudinally oscillating springs in alignment with each other. The springs 50 and 52 of the oscillating systems are at their respective one end connected to an inner housing 55 acting as counter-mass where the oscillations of both systems are superimposed upon each other. The working element is formed by a tool 56, for instance a chisel carried by the inner housing 55. The two oscillating systems have different natural frequencies and are each provided with an electromagnetic exciter 57 and 58 respectively which both rest on an outer housing 59 surrounding the inner housing 55. The inner and outer housings are connected to each other by rubber springs 55a and 55b. In operation, the inner housing oscillates through rubber springs 55a and 55b with regard to the outer housing.

Figure 6:
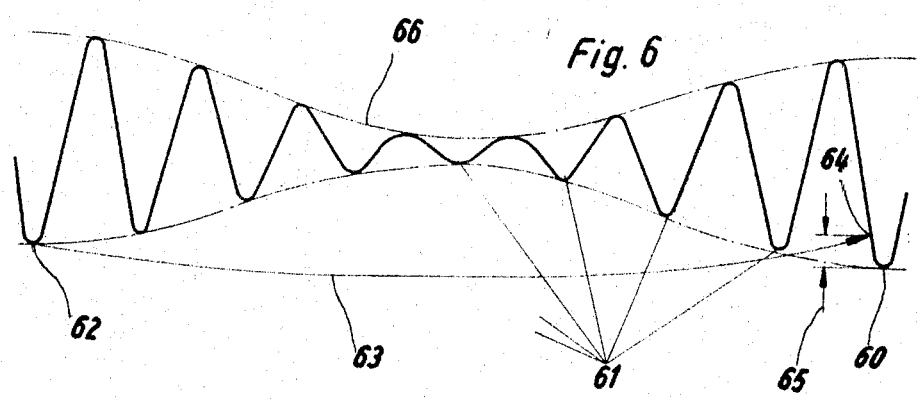
FIG. 6 shows a surge or beat obtained by the superposition of two oscillations with low frequency difference while taking into consideration the shock conditions.

The oscillations of the working element of the device according to FIG. 5 are illustrated in FIG. 6 with the assumption that the frequencies of both oscillating systems slightly differ from each other while the superposition results in a surge or beat. The high frequency oscillation corresponds to the mean value of the frequencies of both oscillating systems and takes place within the limit curves 66 defined by the said low differential frequency so that also in this instance an offsetting between the energy transmitting reversing point 60 and the shock-free reversing point 61 is obtained. The trajectory parabola 63 starting at the last contacting point 62 between the working element and the article will also in this instance lead to the first contacting point 64 of the next following pushing operation whereby between the latter and the reversing point 60 a relatively large pushing stroke 65 is obtained.

In this connection it should be noted that the curves of the beat or surge according to FIG. 6 are, by no means, limited to the sine shape. Furthermore, in addition to the superposition assumed in the example, such forms of oscillation can also be realized by multiplicative modulation of the exciter oscillations. Corresponding effects can also be obtained by adjusting corresponding differences between exciter and natural frequency of one or more oscillating systems while in view of the so-called dragging along (Mitziehen) it is also possible to rock up the oscillation components which differ from the exciter frequency.

The last mentioned principle of the exciting of oscillating systems with natural frequency makes possible the design of oscillating working devices according to the invention with one exciter only for a plurality of oscillating systems. The fundamental structure of such device is shown, for instance, in FIG. 7. According to FIG. 7, the housing 76 has arranged therein a first oscillating system comprising a mass 71 and a spring 72 and also a second oscillating system comprising a mass 73 and a spring 74. The mass 71 of the first oscillating system includes the mass of a working element 77 which is displaceably mounted in the housing 76. The masses 71 and 73 are by means of the respective springs 72, 74 suspended on the housing 76 which latter thus acts as countermass. Both oscillating systems have a common exciter 70 which is directly connected to the oscillating system 71, 72 by means of its mass 71 and is connected to the oscillating system 73, 74 by means of a coupling spring 75. Such a design works advantageously in surge operation with oscillating systems which are only slightly out of tune or resonance, the exciting frequency being between the two natural frequencies.

Another embodiment of the device according to the present invention with one exciter for two oscillating systems which are particularly suitable for highly different natural frequencies of the coupled oscillating systems is shown in FIG. 8. The first oscillating system 101 comprises two symmetrically arranged masses 104a and 104b which latter also comprises the mass of a working element 105. The said first oscillating system also comprises the longitudinally oscillating springs 103a and 103b. Between the two springs there is arranged an exciter 100 at the oscillating node of the thus formed half-wave oscillator. This first oscillating system is advantageously operated within the high frequency range, especially in the ultrasound range and, more specifically, with identical natural and exciter frequency.

The entire oscillating system 101 including the exciter 100 forms the oscillating mass for the second oscillating system 102. The second oscillating system 102 comprises the structural unit representing a mass and formed by the first oscillating system with the exciter which structural unit is suspended within a housing 107 by means of a longitudinally oscillating spring 106 on the exciter 100. During the operation of the device, first the high frequency oscillating system 101 is directly excited, whereas the low frequency oscillating system 102 is by a so-called pumping up by means of a sub-harmonic oscillation of the exciter frequency or a frequency component contained in the exciter oscillation placed into resonance oscillations. During the relative movement of the mass 104b and the working member 105 with regard to the housing 107 as counter-mass, both oscillations superimpose each other in an additive manner whereby the effect according to the invention is obtained with an increased pushing stroke and with periodic charging up of the oscillating systems.

When the tendency to cause oscillations is low in the indirectly excited system, for instance, in the low frequency oscillator, this tendency can be accelerated by introducing an impulse-like disturbance. This can be effected in a simple manner by pushing the working element 105 against the article to be machined. The above referred to phenomenon permits a particularly expedient use. To this end, the tendency to oscillate of the directly excited system is deliberately, for instance, by corresponding damping in a coupling member, held so low that without special impulse, no tendency to form oscillations will be effected. Such a device can be used without special control devices selectively as a pure high frequency oscillator, for instance for vibrating purposes, or the like, or as pushing device with an effect increased by the effect according to the invention.

FIG. 9 illustrates the structural arrangement of the device of FIG. 8. Corresponding parts have been designated with corresponding reference numerals.

The first oscillating system 101 is designed in the form of a long stretched out structural unit which comprises a chisel tip forming the working member 105 or mass 104b, two thin-walled highly tempered steel pipes as longitudinally oscillating springs 103a and 103b on both sides of the centrally arranged exciter 100, and the counter-mass 104a. The structural unit of the first oscillating system, as mentioned above, forms a symmetric longitudinal oscillator, especially a half-wave oscillator in the central range of which an oscillating node is located. In this instance, the diaphragm-shaped spring 106 of the second oscillating system 102 is arranged which establishes the connection with the housing 107 acting as counter-mass. The exciter 100 operates in the ultrasound range and is designed as a customary magnetostriction oscillator with laminated core 100a and the winding 100b.

Within the upper range of the first oscillating system 101 there is additionally arranged a diaphragm 108 serving for parallelly guiding the working element with regard to the housing 107. This diaphragm 108, however, does not transfer any high frequency oscillations onto the housing 107. Thus, the arrangement of the effective oscillating spring 106 of the second system at the oscillating node of the first system has the advantage that substantially no high frequency oscillations will pass into the housing.

It is, of course, to be understood that the present invention is, by no means, limited to the particular embodiments of the invention as illustrated in the drawings, but also comprises any modifications within the scope of the appended claims.

What is claimed is:

1. A device for transmitting work energy to a workpiece and having an oscillating working element and comprising a first oscillatory system for causing oscillation of said working element and including a spring and a mass, said working element being adapted to transmit energy to the work-piece near the terminal point of the oscillations of said working element in one direction, a second oscillatory system for causing said working element to perform idle oscillations free of energy transmission to said work-piece following each working oscillation of the working element during which energy is transmitted to the work-piece, said first and second oscillatory systems each including a spring and a mass effective in being operable for superimposing oscillations of respectively different frequencies on said working element, and coupling means between said first and second oscillatory systems.

2. A device according to claim 1, in which each said system comprises exciter means for exciting said systems, and said coupling means includes a coupling spring interconnecting said systems in series.

3. A device according to claim 1, in which said coupling means comprises a coupling spring interconnecting said masses, exciter means for one of said masses, the other of said masses including said working element, said masses being of substantially the same magnitude, a housing in which said masses and coupling spring are mounted, and means connecting said coupling spring at an oscillation node thereof to said housing.

4. A device according to claim 2 which includes exciter frequency changing means operable to vary the frequency of at least one of said systems thereby to vary the number of idle oscillations following each working oscillation of the working element.

5. A device according to claim 2 which includes exciter intensity changing means operable to vary the frequency of at least one of said systems thereby to vary the number of idle oscillations following each working oscillation of the working element.

6. A device according to claim 2 in which said exciter means is a single exciter acting directly on one of said masses and acting through said coupling spring on the other of said masses.

7. A device according to claim 1 in which said device includes a housing in which said working element is reciprocably mounted, one said mass being connected to said working element, said systems being connected in series between said housing and said working element whereby the housing serves as a counter-weight mass, and means for exciting said systems, said systems oscillating in the direction of reciprocation of said working element and having respectively different frequencies whereby said work element while oscillating at the higher of the frequencies of said systems advances toward and retracts from position to transfer energy to a work-piece at the lower of said frequencies.

8. A device for transmitting kinetic enregy upon a work means and with which work oscillations of more pronounced amplitude alternate with idling oscillations of reduced amplitude, comprising: a first oscillating system for transmitting energy causing work oscillations of the work means, at least one additional oscillating system for causing the work means to have idling oscillations, at least one coupling spring means interconnecting said first and additional oscillating systems, and at least one exciter means optionally having equal and differing frequency driving said oscillating systems, at least one of said first and additional oscillating systems having a natural frequency differing from frequency of said exciter means.

9. A device according to claim 8, in which said coupling spring means includes one coupling spring capable of longitudinal oscillation and consisting of highly tempered bar steel.

10. A device according to claim 8, in which at least one of said oscillating systems includes an energy storing spring capable of longitudinal oscillation and consisting of highly tempered bar steel.

11. A device according to claim 8, in which a means for change of frequency of said exciter means is provided for altering amplitude of idling oscillations.

12. A device according to claim 8, in which a means for change of exciter output of at least one of said oscillating systems coupled to the work means is provided for change of amplitude of work oscillations.

13. A device according to claim 8, in which one of said oscillating systems has a natural frequency coinciding with that of exciter component frequency oscillation and optionally at least nearly coinciding with frequency of said exciter means.

14. A device according to claim 8, in which at least one of said oscillating systems has a natural frequency coinciding with that of exciter component frequency oscillation and optionally at least nearly coinciding harmonically with frequency of said exciter means.

15. A device according to claim 14, in which natural frequency of one of said oscillating systems corresponds to one subharmonic oscillation and natural frequency of another of said oscillating systems.

16. A device according to claim 8, in which said exciter means is connected directly to said first oscillating system and is connected by at least one of said coupling spring means to said additional oscillating system.

17. A device according to claim 8, in which said first oscillating system is a structural unit having mass connected by at least one of said spring means to said exciter means collectively forming mass of said additional oscillating system.

18. A device according to claim 17, in which a counter-weight-forming housing and said structural unit of said first oscillating system are interconnected by at least one of said spring means of said additional oscillating system.

19. A device according to claim 18, in which said structural unit of said first oscillating system is provided as a symmetrical longitudinal oscillator particularly as a half-wave oscillator with masses arranged at each of opposite ends of longitudinally oscillating spring means and connected to said housing within the range of an oscillating node.

20. A device according to claim 18, in which said structural unit of said first oscillaitng system is formed by a high frequency oscillator and said additional oscillating system is a low frequency oscillator with said housing and spring means forming counter-weight for said structural unit.

21. A device according to claim 8, in which natural frequency of one oscillating system is below the sound frequency range and in which natural frequency of said additional oscillating system is within the ultrasonic range.

22. A device according to claim 8, in which one oscillating system has natural frequency differing from frequency of said exciter means and is adapted selectively to be placed into oscillating operation by introduction of impulse due to work means counteraction.

References Cited

UNITED STATES PATENTS

| | | | |
|---|---|---|---|
| 637,808 | 11/1899 | Meissner | 173—117 X |
| 2,861,778 | 11/1958 | Spurlin | 173—117 |
| 2,949,909 | 8/1960 | Macchioni, et al. | 175—56 X |
| 3,004,389 | 10/1961 | Muller | 175—56 X |
| 3,336,988 | 8/1967 | Jones | 175—56 X |

NILES C. BYERS, JR., Primary Examiner

U.S. Cl. X.R.

173—117